(12) United States Patent
Katayama

(10) Patent No.: US 6,714,499 B2
(45) Date of Patent: Mar. 30, 2004

(54) FLYING OPTICAL RECORDING/PLAYBACK HEAD AND METHOD FOR CONTROLLING THE FLYING HEIGHT

(75) Inventor: Koji Katayama, Kanagawa (JP)

(73) Assignee: Tosoh Corporation, Yamaguchi-ken (JP)

( * ) Notice: Subject to any disclaimer, the term of this patent is extended or adjusted under 35 U.S.C. 154(b) by 62 days.

(21) Appl. No.: 09/769,961

(22) Filed: Jan. 26, 2001

(65) Prior Publication Data

US 2001/0033546 A1 Oct. 25, 2001

(30) Foreign Application Priority Data

Jan. 27, 2000 (JP) .......................................... 2000-023343

(51) Int. Cl.[7] ................................................. G11B 3/90
(52) U.S. Cl. ................................. 369/53.25; 369/112.23
(58) Field of Search ........................ 369/13.32, 13.33, 369/300, 44.25, 44.11, 53.19, 53.25, 53.27, 53.28, 53.29, 112.23, 112.25, 121, 126

(56) References Cited

U.S. PATENT DOCUMENTS 6,307,832 B1 * 10/2001 Novotny et al. ............... 369/71

FOREIGN PATENT DOCUMENTS

JP 2000-99970 4/2000

OTHER PUBLICATIONS

B. D. Terris et al., "Near–field optical data storage", Appl. Phys. Lett. vol. 68, No. 2, Jan. 8, 1996, American Institute of Physics, pp. 141–1430.

Koichiro Kishima et al., "Near–Field Phase–Change Optical Recording over 1.2–Numerical–Aperture", SPIE, vol. 3864, Jul. 1999, pp. 355–357.

Shingo Imanishi et al., "Near Field Optical Head on Disk Mastering Process", SPIE, vol. 3864, Jul. 1999, pp. 9–11.

* cited by examiner

*Primary Examiner*—Paul W. Huber
(74) *Attorney, Agent, or Firm*—Sughrue Mion, PLLC

(57) ABSTRACT

A flying optical recording/playback head for near-field optical recording/playback, which is capable of keeping the flying height of an optical lens to be constant and obtaining a stable playback signal, is provided. In the flying optical recording/playback head, a device for controlling the relative position between a slider and the optical lens based on a thermal expansion or a piezoelectric effect of an optical lens supporting member for holding the optical lens on the slider, or a thermal expansion of a portion of the optical lens.

22 Claims, 9 Drawing Sheets

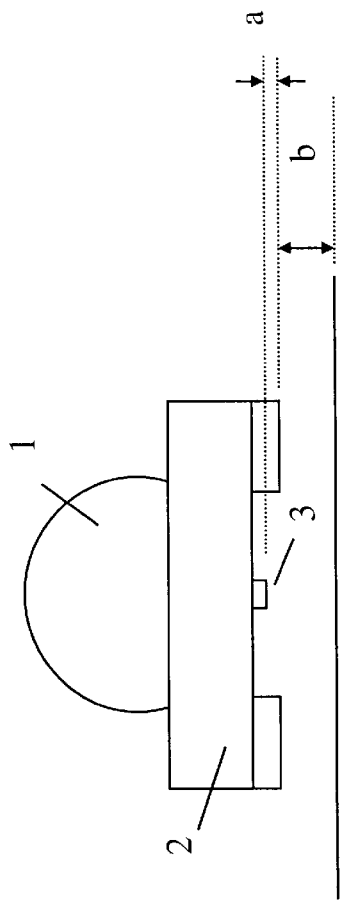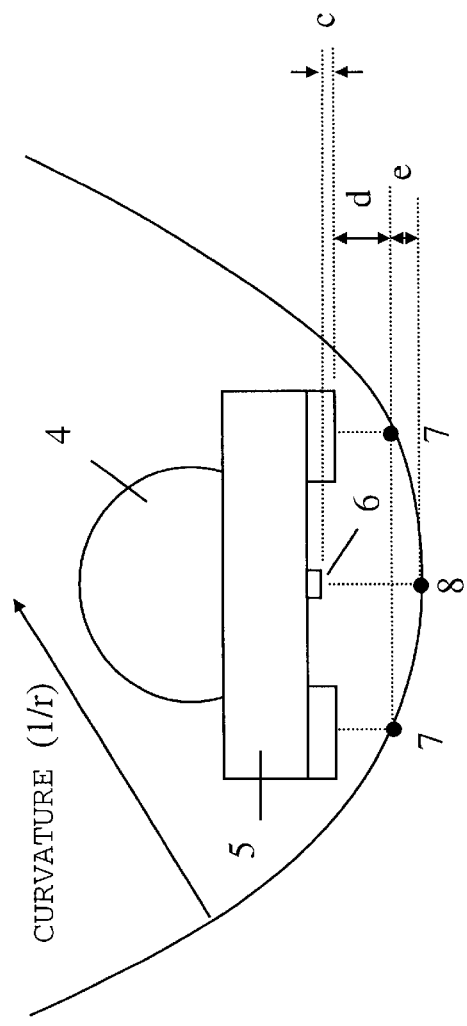

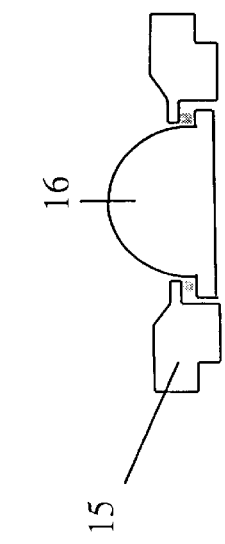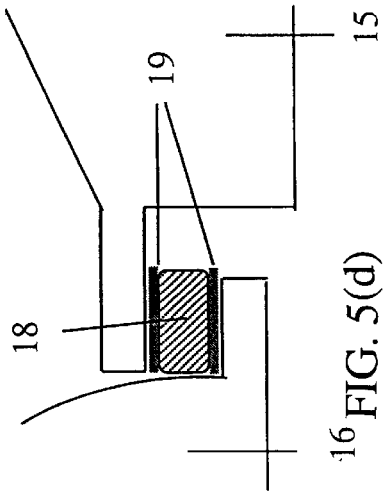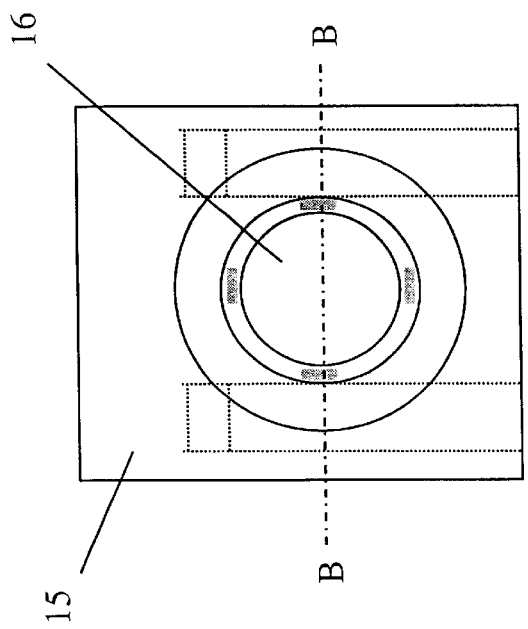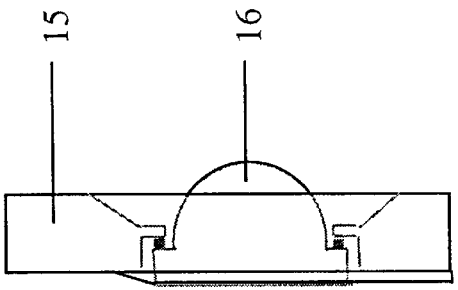
FIG. 5(d)
FIG. 5(b)
FIG. 5(c)
FIG. 5(a)

FLYING OPTICAL RECORDING/PLAYBACK HEAD AND METHOD FOR CONTROLLING THE FLYING HEIGHT

BACKGROUND OF THE INVENTION

1. Field of the Invention

The present invention relates to a flying optical recording/playback head for information-recording/playing back by flying and running relatively above the medium surface of an optical recording medium capable of recording and playing back, in particular, an optical recording medium for recording, reproducing and erasing information by changing the optical characteristics or the magnetic characteristics of the recording layer by laser beams, and a method for controlling the flying height of the head.

2. Discussion of Background

A magneto-optical recording medium is a portable recording medium permitting large volume/high density recording, for which demands have rapidly been increasing for a large volume file or a rewritable medium for recording dynamic images for a computer in current fashion of multimedia.

The optical recording medium generally comprises a transparent circular disk-like substrate of a plastic material or the like on which a multilayer including a recording layer is formed, and in which recording and erasing are carried out by irradiating laser and playback is carried out by reflection light of laser.

Conventionally, laser for recording and playback was irradiated to the recording layer through the substrate. Recently, a technique for bringing the optical head closer to the recording layer to record and playback, a so-called near-field optical recording has been noted as means for increasing the density of recording (Appl. Phys. Lett. 68, p.141 (1996)). In this recording method, a solid immersion lens (hereinbelow, referred to as SIL) head is used to reduce the size of the laser beam spot, whereby it is possible to playback by a shorter mark determined by a laser wavelength ($\lambda$) of a light source (~$\lambda$/2NA: NA represents a numerical aperture of an objective lens), and therefore, recording and playback can be realized at a superhigh recording density. In the near-field optical recording, it is necessary to bring the optical head closer to the recording medium (~100 nm). Accordingly, unlike laser beams which are irradiated to the recording layer through the substrate as in the conventional magneto-optical recording medium, a method for irradiating directly laser beams to the recording layer without passing through the substrate is used. In this case, a flying type slider head is often used in order to bring the SIL head closer to the recording layer.

The flying type slider head is so adapted that a buoyant force is produced at the air-bearing slider by a flow of air caused by a movement of the recording medium, whereby the head runs above the surface of the recording medium. Since a flying height produced by the air-bearing slider generally depends on a moving speed of the recording medium, control of the flying height is possible by controlling the number of revolutions of a disk-like recording medium. However, there is a problem that the flying height varies depending on a position (in radius) on the recording medium if the number of revolutions is constant. In this connection, an attempt that the flying height is kept constant over the entire surface of the disk-like recording medium by contriving the shape and so on of the slider plane of the air-bearing slider so that dependency of the flying height on the moving speed is eliminated.

On the other hand, a slider head used for optical recording and playback generally has air-bearing sliders at both edges and an optical element such as SIL or the like at the center of a region interposed between the two air-bearing sliders. The size of the slider head is usually about several mm, and the size of the air-bearing sliders is from about the same to $\frac{1}{10}$ as large as the head. On the other hand, the size of a photo-coupling region existing in the lowermost plane of the SIL head is about 1 $\mu$m. Accordingly, if the surface of the optical recording medium is not flat, a flying height of a photo-coupling portion (the distance between the photo-coupling portion and the surface of the optical recording medium opposing thereto) where the photo-coupling region exists is not always constant even when the flying height of the air-bearing sliders themselves is constant. In particular, since the flying height of the photo-coupling portion is very small as 100 nm or less, there is substantial influence on the flying height of the photo-coupling portion even though the radius of curvature of projections and recesses in the surface of the optical recording medium is about several m. Further, the flying height of the air-bearing sliders themselves is different from the flying height of the photo-coupling portion above the projections and recesses even when the two-dimensional spread of the projections and recesses in the surface of the optical recording medium is about from several ten to several hundred $\mu$m.

The optical recording medium is generally fabricated by using a substrate obtained by injection-molding resin such as polycarbonate or the like. However, it is difficult to form a substrate having a completely flat plane because of variation of the shape of a stamper used for the injection-molding and conditions of shaping, and therefore, there is a curve in the substrate surface in its entirety or projections and recesses having a spread of about several ten to several hundred $\mu$m in the substrate surface.

On the other hand, in the near-field optical recording, the intensity of a playback signal largely depends on a flying height of the photo-coupling portion, i.e., a photo-coupling gap (the distance between the photo-coupling portion and the surface of the optical recording medium opposing thereto). Accordingly, even when the flying height of the air-bearing sliders themselves can be kept constant, the size of the photo-coupling gap varies whereby it is difficult to obtain a stable playback signal.

From such reasons, there was a problem that a stable flying height of the photo-coupling portion of the flying type slider head could not be obtained by controlling only the shape of the air-bearing sliders of the flying type slider head or controlling only the moving speed of the optical recording medium. Accordingly, the playback signal was deteriorated.

SUMMARY OF THE INVENTION

An object of the present invention is to provide an optical recording/playback head for near-field optical recording/playback which can, for example, keep the distance between an optical lens such as SIL or the like and a recording medium, namely, the flying height of an optical element such as the optical lens or the like to be constant to thereby obtain a playback output stably.

The inventor of this application has made intensive study in view of the above-mentioned circumstances and has achieved the present invention.

Namely, the flying optical recording/playback head of the present invention is a flying optical recording/playback head having a slider for producing buoyancy by a movement of an optical recording medium and an optical element for irradiating light for information-recording and/or playback to the optical recording medium, which is characterized by comprising a device for controlling the relative position between the slider and a nearest surface of the optical element which is nearest to the optical recording medium (hereinbelow, referred to as the nearest surface of the optical element). In particular, there is provided a flying optical recording/playback head wherein control for the relative position is carried out by a thermal expansion or a piezo-electric effect of an optical element supporting member for holding the optical element on the slider, or a thermal expansion of at least a portion of the optical element.

Further, the flying optical recording/playback head of another aspect of the present invention is a flying optical recording/playback head having a slider for producing buoyancy by a movement of an optical recording medium and an optical element for irradiating light for information-recording and/or playback to the optical recording medium, which is characterized in that the optical element has a photo-coupling portion having a flat plane substantially parallel to the surface of the optical recording medium at a side opposing the optical recording medium, and a device for controlling the relative position between the photo-coupling portion and the slider is provided. In particular, there is provided a flying optical recording/playback head wherein the optical element is provided with a cylindrical projection projecting toward the optical recording medium in its surface opposing to the optical recording medium, and the photo-coupling portion is formed of a flat plane substantially parallel to the surface of the optical recording medium, the flat plane being at the end of the cylindrical projection, whereby the relative position between the slider and the photo-coupling portion is controlled based on a thermal expansion of the cylindrical projection. Further, it is preferable that a thin layer having an electric resistance is formed on the side surface of the cylindrical projection, whereby the relative position between the slider and the photo-coupling portion is controlled by controlling power supplied to the thin layer having an electric resistance.

The flying type optical recording/playback head of another aspect of the present invention is characterized by a flying optical recording/playback head having a slider for producing buoyancy by a movement of an optical recording medium and an optical element for irradiating light for information-recording and/or playback to the optical recording medium, wherein the optical element attached to the slider has a flat plane at a light emitting side; a cylindrical projection projecting in a cylindrical form is formed in a portion of the flat plane; and a thin layer having an electric resistance is formed on the side surface of the cylindrical projection, whereby the distance between the photo-coupling portion comprising the end plane of the cylindrical projection and the optical recording medium is controlled by utilizing a change of the shape of the cylindrical projection due to a thermal expansion, which is caused by supplying power to the thin layer having an electric resistance.

Further, the method for controlling the flying height of the flying optical recording/playback head of the present invention is a method for controlling the flying height of the flying optical recording/playback head characterized in that photo-coupling gap as the distance between a nearest surface of the optical element, i.e., a photo-coupling portion and the surface of the optical recording medium is detected, and the relative position between the nearest surface of the optical element, i.e., the photo-coupling portion and the slider is changed by utilizing a fluctuation quantity with respect to a reference value obtained by the detection to thereby control the photo-coupling gap to be constant. Further, in the method for controlling the flying height of the flying optical recording/playback head, it is preferable that the size of the photo-coupling gap is detected by an intensity of returning light from the optical element and the optical recording medium.

The optical element in the present invention is, for example, an optical lens, a hemi-spherical solid immersion lens, or an optical fiber having a tapered portion thinned toward its end.

More specifically, the present invention relates to a flying optical recording/playback head having a slider for producing buoyancy by a movement of an optical recording medium and an optical lens for irradiating light for information-recording and/or playback to the optical recording medium, characterized in that a device for controlling the relative position between the slider and an optical lens is provided, e.g., a flying optical recording/playback head having a device utilizing either effect of heat or a voltage in order to change the relative position between the slider and the optical lens. Namely, a thermal expansion or a piezo-electric effect of an optical lens supporting member for holding the optical lens on the slider is used. Further, the method for controlling the flying height of the present invention is a method for controlling the flying height, characterized in that a photo-coupling gap as the distance between the optical lens and the optical recording medium (a flying height of the optical lens) is detected, and the relative position between the optical lens and the slider is changed by utilizing a fluctuation quantity with respect to a reference value obtained by the detection to thereby control the photo-coupling gap to be constant.

BRIEF DESCRIPTION OF THE DRAWINGS

FIG. 1 is a diagram showing a state of flying of the slider head above the surface of an optical recording medium having a flat plane without projections and recesses.

FIG. 2 is a diagram showing a state of flying of the slider head above the surface of an optical recording medium having a curvature.

FIGS. 5(a) through 5(d) are diagrams showing another example of the flying optical recording/playback head of the present invention wherein (a): a plan view, (b): a side view, (c): a cross-sectional view of B—B line, and (d): an enlarged cross-sectional view showing an optical lens supporting member and surrounding thereof.

Figure 3:
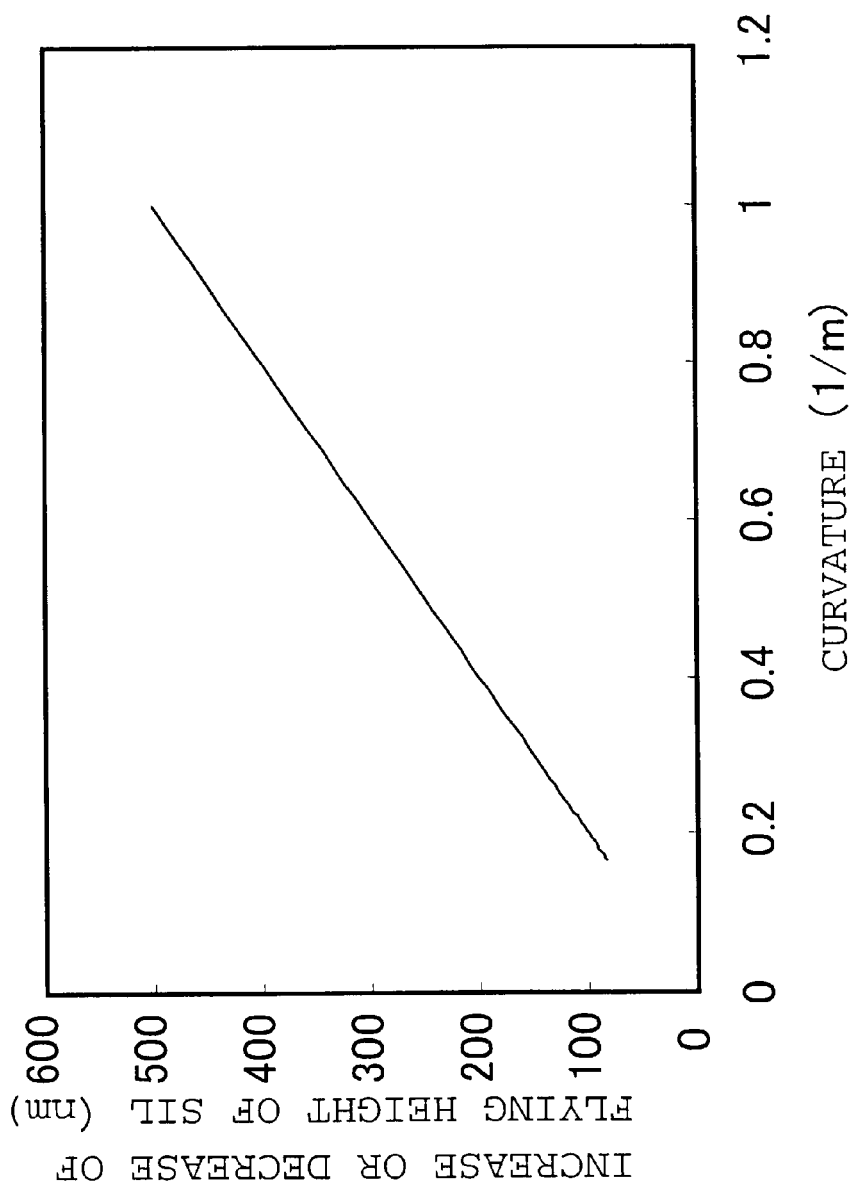
FIG. 3 is a diagram showing a variation quantity of a flying height of SIL with respect to a change of curvature.

EXPLANATION OF REFERENCE NUMERALS 1, 4: SIL
2, 5: Slider
3, 6: Lowermost plane of SIL
7: The point of intersection of a normal line from a reference plane of the slider to the recording medium
8: The point of intersection of a normal line from the lowermost plane of SIL to the recording medium
10, 15, 20: Slider
11, 16, 21, 24: SIL
13: Resistance wire
14, 24: Resinous adhesive
18: Piezoelectric element
19: Electrode
25: Cylindrical projection
26: Thin layer wiring of Cu
27: Thin layer resistor of nichrome
28: Substrate
29: Reflection layer
30: Recording layer
31: Dielectric layer
32: Solid lubricant layer
33: Lubricant layer

DETAILED DESCRIPTION OF THE PREFERRED EMBODIMENTS

In a near-field optical recording/playback system, generally, the quantity of returning light from the lens plane (the quantity of reflection light) decreases as the distance between SIL and a recording layer in the recording/playback medium is closer, and the intensity of a recording signal increases as the propagation rate of light into the recording layer increases. Contrary, when the distance is increased, the quantity of returning light (the quantity of reflection light) from the lens plane increases, and the propagation rate of light into the recording layer exponentially decreases, whereby the intensity of the recording signal decreases. The presence of minute projections and recesses, a curve or a deformation of the surface of an optical recording medium causes a change of the photo-coupling gap between the lowermost plane of SIL and the optical recording medium, i.e., the near-field coupling distance, whereby the propagation rate of light into the recording layer varies with the result that the intensity of the recording signal is changed. Namely, the propagation rate of light to the recording layer is decreased by increasing the distance between a photo-coupling plane (a photo-coupling portion) as the lowermost plane of SIL and the surface of the optical recording medium (i.e., an optical coupling gap), whereby reduction in recording efficiency or deterioration of a playback signal is resulted.

When the substrate is made of an aluminum alloy or glass as in a hard disk, the plane of the substrate is nearly flat, and accordingly, the relation between a flying height of the flying head and a flying height of the optical element is kept to be substantially constant. However, since an optical disk comprises the substrate made of resin, there exist a curve in the shape of the disk and minute projections and recesses in the surface. Generally, in a slider head for near-field optical recording/playback is designed so that SIL is located at a central portion, and a pair of air-bearing sliders are formed at its both sides. In a plane perpendicular to the axis along the movement of the medium (a moving direction of the optical recording medium), the pair of air-bearing sliders has a distance of several mm, and the length of the air-bearing is several mm as well. Accordingly, a curve in the surface of the disk in a radial direction or a circumferential direction causes a change in the distance between the lowermost plane of SIL head and the surface of the medium although a flying height in average with respect to the plane of the air-bearing sliders is constant.

FIG. 1 shows a diagram in a state of flying of the slider head in a case that the surface of a recording medium has a plane free from projections and recesses. In this case, the photo-coupling gap between the lowermost plane 3 of SIL and the optical recording medium is obtained by the sum of a flying height b of an air-bearing slider portion of the slider head and an offset value a determined by the shape of the slider head.

On the other hand, FIG. 2 shows a diagram in a state of flying of the slider head in a case that there are projections and recesses having a larger size than the slider head in the surface of a recording medium. In this case, the photo-coupling gap as the distance from the lowermost plane 6 of SIL to the point 8 opposing thereto on the optical recording medium is the sum total of a flying height d of the air-bearing slider, an offset value c determined by the shape of the slider head and a value e determined by an amount of curve in a projection or recess where d represents the distance between the reference plane of the air-bearing slider and a point 7 opposing thereto on the optical recording medium (a flying height of the air-bearing slider). It is found that the flying height varies depending on an increase or decrease of a curvature of the projection or recess.

FIG. 3 shows an increase or decrease of the flying height of SIL (photo-coupling gap) vs a curvature in the surface of an optical recording medium in a case of using an optical slider head having a pair of air-bearing sliders with a space of 1 mm and SIL provided at the center in a region between the two air-bearing sliders. Here, the flying height of an air-bearing slider portion was based on the length of a line drawn perpendicularly from the point of the center of each air-bearing slider to the surface of the recording medium in a plane sectioned perpendicularly to a direction of moving of the slider head with respect to the disk. Further, the flying height of SIL was based on the length of a line drawn perpendicularly from the center of the lowermost plane of SIL to the surface of the recording medium. The relation between the flying height of SIL (photo-coupling gap) and the actual flying height of the air-bearing slider is applicable substantially as well even to a direction of moving of the slider head with respect to the disk (a circumferential direction).

In such circumstances, it is not easy to keep, by only the flying type slider, the photo-coupling gap between the optical element such as SIL and the recording medium to be constant with accuracy in the order of several ten nm. Accordingly, in addition to the flying type slider, the provision of a movable device for conducting a fine adjustment to the flying height of the optical element is needed for the near-field optical recording/playback.

The present invention concerns a flying optical recording/playback head capable of near-field optical recording/playback by providing a device for changing the relative position between a flying plane of the slider and a photo-coupling plane (a photo-coupling portion) to a recording medium, which exists in the lowermost plane of the optical element such as an optical lens or the like, whereby a fine adjustment to the flying height of the lowermost plane of the optical element is conducted, and the flying height of it can be maintained to be constant.

Figure 4:
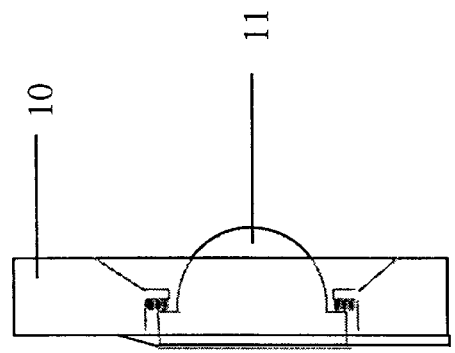
FIGS. 4(a) through 4(d) are diagrams showing an example of the flying optical recording/playback head of the present invention wherein (a): plan view, (b): a side view, (c): a cross-sectional view of A—A line, and (d): an enlarged cross-sectional view showing an optical lens supporting member and surrounding thereof.
Figure 4:
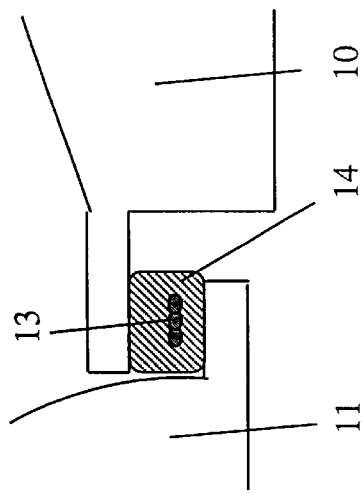
Figure 4:
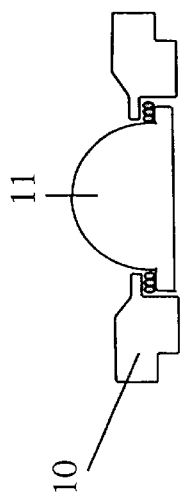
Figure 4:
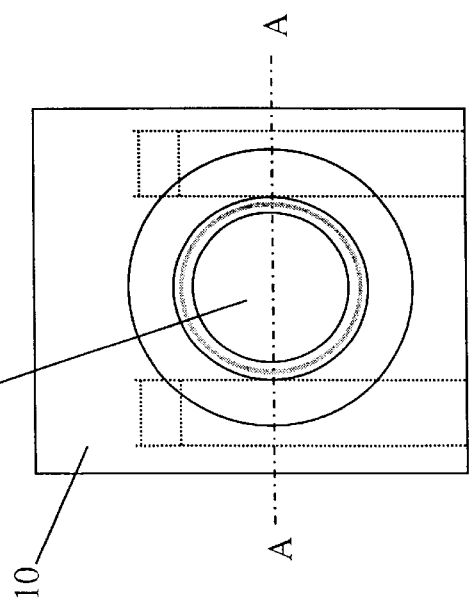
Figure 6A:
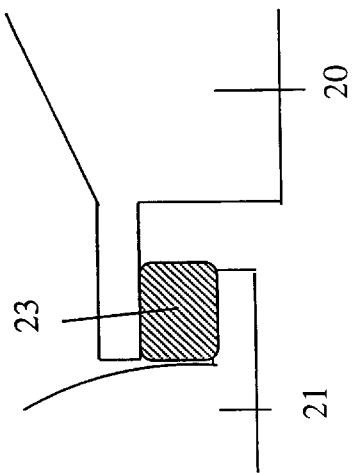
FIGS. 6(a) through 6(d) are diagrams showing an example of a conventional flying optical recording/playback head used in Comparative Example wherein (a): a plan view, (b): a side view, (c): a cross-sectional view of C—C line, and (d): an enlarged cross-sectional view showing an optical lens supporting member and surrounding thereof.
Figure 6B:
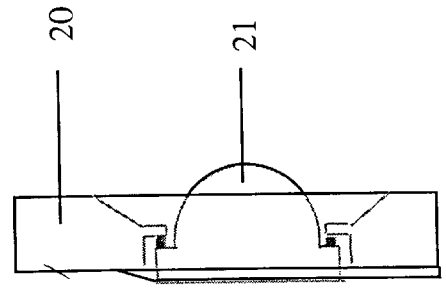
Figure 6C:
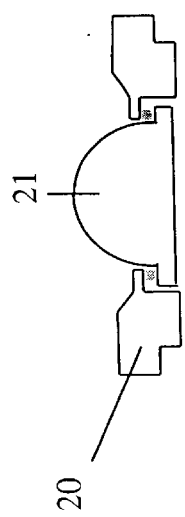
Figure 6D:
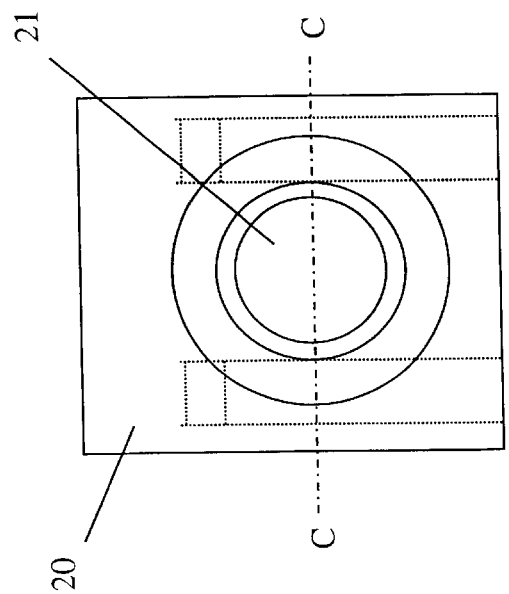

FIG. 4 is a diagram showing an embodiment of the flying optical recording/playback head of the present invention.

FIG. 4(a) is a plan view of the flying optical recording/playback head of this embodiment observed from an upper side, FIG. 4(b) is a side view, FIG. 4(c) is a sectional view taken along a line A—A passing through the center of SIL 11, and FIG. 4(d) is an enlarged cross-sectional view showing an optical lens supporting member and the surrounding thereof.

In the flying optical recording/playback head of this embodiment, SIL 11 as an optical lens is supported by the optical lens supporting member on a slider 10 for producing buoyancy by a movement of a recording medium. The optical lens supporting member holds SIL on the slider, and has function to change the relative position between the slider and SIL.

In this embodiment, the optical lens supporting member comprises a winding 13 formed of a resistance wire and a resin body 14 surrounding the winding, which is bonded to a connecting portion between SIL and the slider as shown in FIG. 4(d), and it is provided in an annular form along the circumference of SIL in the connecting portion between SIL and the slider as shown in FIG. 4(a). By utilizing heat generated by feeding an electric current in the winding 13 formed of a resistance wire, the resin body is heated to cause a thermal expansion, whereby it is possible to control the relative positional relation between SIL and the slider.

FIG. 5 is a diagram showing another embodiment of the flying optical recording/playback head of the present invention. FIG. 5(a) is a plan view of the flying optical recording/playback head of this embodiment observed from an upper side, FIG. 4(b) is a side view, FIG. 4(c) is a sectional view sectioned along a line B—B passing through the center of SIL, and FIG. 4(d) is an enlarged cross-sectional view of an optical lens supporting member and the surrounding thereof.

In the flying optical recording/playback head of this embodiment, SIL 16 as an optical lens is held by an optical lens supporting member on a slider 15 producing buoyancy by a movement of a recording medium. The optical lens supporting member has function to change the relative position between the slider 15 and SIL 16.

In this embodiment, the optical lens supporting member comprises a piezoelectric element 18 and electrodes 19 provided on its both planes, which is disposed in a connecting portion between SIL 16 and the slider 15 as shown in FIG. 5(d), and four optical lens supporting members are disposed around SIL in the connecting portion between SIL and the slider as shown in FIG. 5(a). By applying a voltage to the electrodes 19 disposed on the both planes of the piezoelectric element 18, expansion or contraction of the piezoelectric element is caused, whereby it is possible to control the relative positional relation between SIL and the slider.

Figure 10:
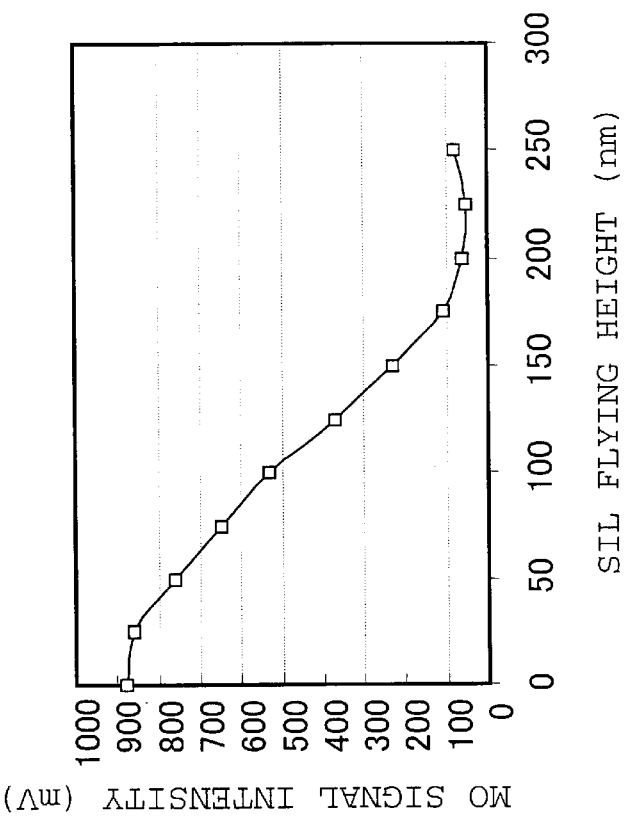
FIG. 10 is a diagram showing an example of the relation of a flying height of SIL to an intensity of MO signal.
Figure 9:
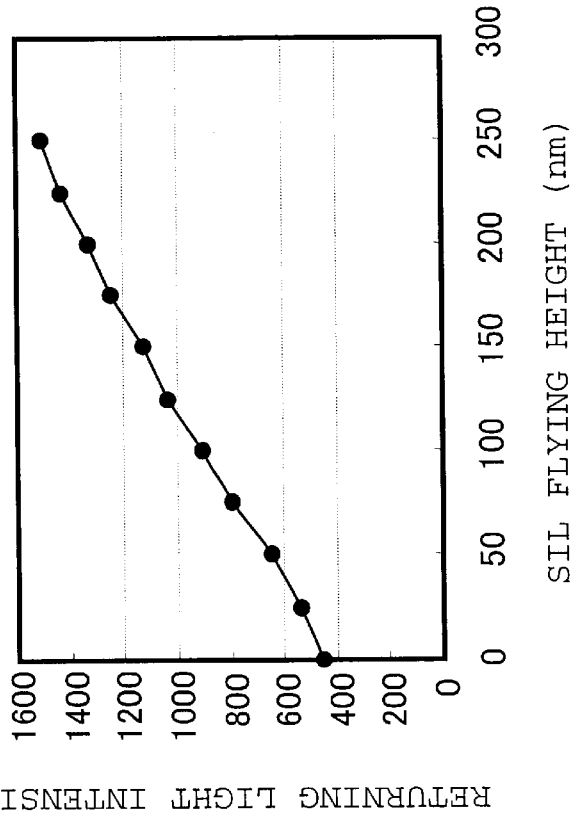
FIG. 9 is a diagram showing an example of the relation of a flying height of SIL to an intensity of returning light.

On the other hand, in a near-field magneto-optical recording medium, when the flying height of SIL (the SIL head flying height) varies, the intensity of a magneto-optical recording signal (MO signal intensity) and the quantity of playback light (returning light intensity) as the sum total of a returning light quantity from the lowermost portion of the lens and a reflection light quantity from the recording layer, measured with use of a magneto-optical reproducing optical system, vary as shown in FIGS. 9 and 10 as examples.

Accordingly, by changing the relative position between SIL and the slider so that the returning light quantity of the playback light or the magneto-optical recording signal intensity is constant, it is possible to control the flying height of SIL to be constant. Specifically, the central value of fluctuation values of the intensity of the playback light is determined to be reference voltage, and the fluctuation values of the playback light are produced by a differential circuit. Based on the signals obtained by passing signals with time of the thus obtained fluctuation values through a low pass filter of 30 kHz, control is carried out by a servo circuit so that the flying height of SIL is led to decrease in a case that the returning light quantity to the reproducing optical system increases, and the flying height of SIL is led to increase in a case that the returning light quantity decreases. In the present invention, the magneto-optical recording signals mean signals obtained by a magneto-optical recording method and have the same meaning as the magneto-optical playback signals.

In this embodiment, application to SIL is described. However, an optical fiber having a tapered portion thinned toward its an end can be used as an optical element in a high density recording/playback system using near-field light. In this case too, the present invention can be applied by contriving the attachment of the supporting member to the slider head or adding an element for controlling a thermal expansion of the end portion.

Further, with respect to the flying height detecting method, a thin electric conductive layer may be formed in the recording medium and electrodes may be formed on the optical element other than the above-mentioned embodiment. Thus, it is possible to control the flying height by observing a change of the electrostatic capacity between them.

EXAMPLES

Now, the present invention will be described in detail with reference to Examples. However, the present invention is by no means restricted by such specific Examples.

EXAMPLE 1

Figure 8:
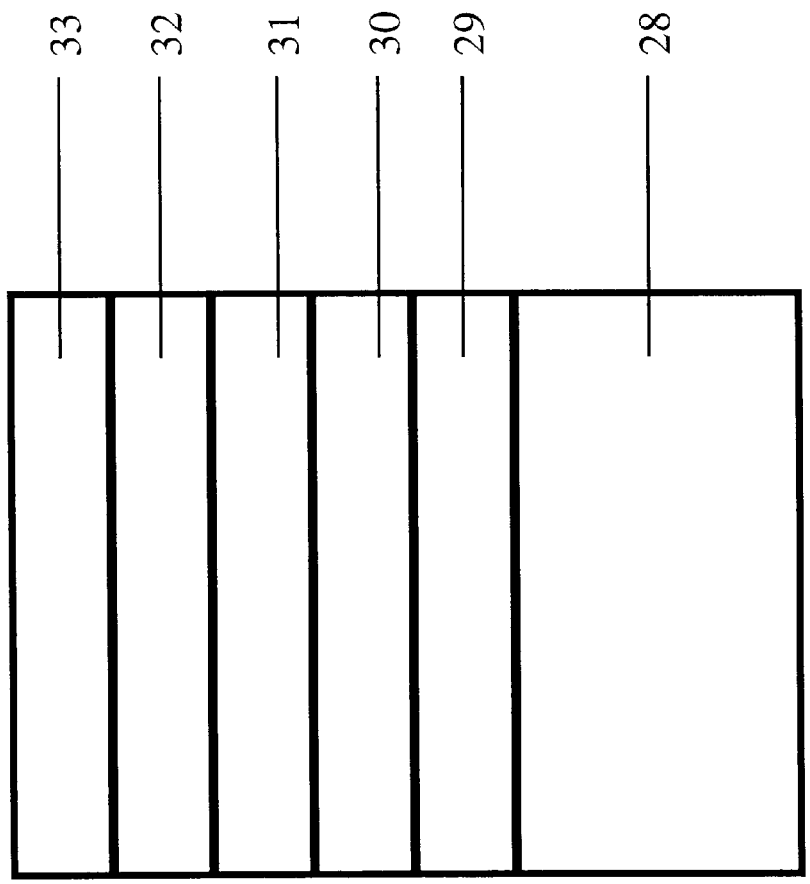
FIG. 8 is a diagram showing a layer structure of the near-field magneto-optical recording medium used in Example.

As a medium used for tests for the flying optical recording/playback head of the present invention, the medium for near-field magneto-optical recording having the construction as shown in FIG. 8 was prepared. On a substrate 28 of polycarbonate having guide grooves of a track pitch of 0.43 $\mu$m, a reflection layer 29 composed of a Cu layer having a film thickness of 50 nm was formed by a DC sputtering method. On this, a recording layer 30 composed of Tb(FeCo) having a coercive force of 10 kOe was formed in a thickness of 20 nm by the DC sputtering method. Further, on this, a dielectric layer 31 composed of SiN was formed in a thickness of 50 nm by a reactive DC sputtering method using a Si target in a mixed atmosphere of Ar and $N_2$, and a solid lubricant layer 32 composed of diamond-like carbon (DLC) was formed in a thickness of 15 nm by a reactive RF sputtering method using a C target in a mixed atmosphere of Ar and $CH_4$. After the DLC layer was formed, a perfluoropolyether type lubricant layer 33 was coated in a thickness of 1 nm to prepare a magneto-optical recording medium.

The flying optical recording/playback head shown in FIG. 4 was prepared. Designing is made so that the slider 10 is held at a load of 5 g, and a lower plane of the slider flies 100 nm high at a circumferential speed of 10 m/sec.

SIL 11 was of a hemi-sphere having a radius of 1 mm, and a winding 13 formed of a nichrome resistance wire wrapped by resin 14 was bonded to a connecting portion between SIL 11 and the slider 10.

FIG. 9 and FIG. 10 show fluctuations in the returning light intensity from SIL and the optical recording medium, and the magneto-optical recording signal intensity (MO signal intensity) vs flying heights of SIL on the near-field magneto-optical recording medium prepared according to the above-mentioned. FIG. 9 and FIG. 10 show results obtained by measuring the returning light from the lowermost portion of SIL and the returning light from the recording layer by using an optical system for magneto-optical playback. In the change of the flying height of SIL head in the order of several ten nm, it is found that the sum total of the returning light quantity (reflection light quantity) and the magneto-optical recording signals (MO signals) vary.

The maximum displacement quantity of a thermally expanded medium portion including a resinous adhesive (an optical lens supporting member) was 30 nm at the largest value of an applied electric current (the largest electric current to which the displacement quantity of the thermally expanded medium changes linearly). Accordingly, designing was made so that the width of adjustment of flying height was within ±15 nm with respect to the regular flying height of SIL, and the flying height of SIL above a glass substrate was 85 nm when an applied electric current is 0, before the attachment.

In order to keep the returning light quantity, as the playback light for controlling the flying height of SIL of the optical head shown in FIG. 4, constant, the central value of fluctuation values of playback light is taken as the reference voltage, and the fluctuation values are produced by a differential circuit. Based on the signals obtained by passing the thus obtained fluctuation values through a low pass filter of 30 kHz, a servo circuit was prepared to feed an electric current to the resistance wire 13 of the optical lens supporting member so that the flying height of the SIL head is led to decrease in a case that the returning light quantity increases, and the flying height of the SIL head is led to increase in a case that the returning light quantity decreases.

The gain of the circuit which determines an electric current fed from the differential circuit to the resistance wire was determined by adjusting a fluctuation of the returning light intensity to be minimum in the tracking.

The prepared magneto-optical recording medium was rotated at 2400 rpm. The tracking is fixed to a land portion at a position of 40 mm in radius, and domains of 1.6 µm mark size were recorded with an external DC magnetic field of 300 Oe, a frequency of optical pulses of 3.14 MHz and a duty of 30%. Then, the recorded portion was reproduced to measure the envelope of MO signals. Table 1 shows values (%) obtained by regularizing a fluctuation quantity of the envelope of the obtained MO signals by a mean value of the amplitude values of the MO signals for one circle.

TABLE 1

|  | Fluctuation value in the amplitude of MO signals (%) |
| --- | --- |
| Example 1 | 10 |
| Example 2 | 2 |
| Example 3 | 5 |
| Comparative Example 1 | 40 |

Example 2

The flying optical recording/playback head as shown in FIG. 5 was prepared. Designing is so made that the slider 15 is held with a load of 5 g and a lower plane of the slider flies 100 nm high at a circumferential speed of 10 m/sec in the same manner as Example 1.

SIL 16 was of a hemi-spherical shape having a radius of 1 mm, and four optical lens supporting members each comprising a piezoelectric element 18 with electrodes 19 at upper and lower planes, as shown in FIG. 5(d), were located around SIL 16 and attached to a connecting portion between SIL 16 and the slider 15 by using adhesive as shown in FIG. 5(a).

The maximum displacement quantity of the piezoelectric elements was 50 nm at the largest value of an applied electric current (the largest voltage to which the displacement quantity of the piezoelectric elements changes linearly to voltages). Accordingly, designing of SIL lens was so made that a width of adjustment of ±25 nm was determined with respect to a regular flying height, and the flying height of SIL above the glass substrate was 75 nm when an applied voltage was 0, before the attachment.

In order to keep the quantity of returning light as playback light constant to conduct control for the flying height of SIL of the flying optical recording/playback head shown in FIG. 5, the center value of fluctuation values of the playback light is taken as the reference voltage, and the fluctuation values are produced by a differential circuit. A servo circuit was designed so that signals obtained by passing the signals, with time, of the thus obtained fluctuation values through a low pass filter of 30 kHz could control an applicable voltage to the piezoelectric elements in a case that when the quantity of returning light increased, the flying height of SIL head was led to decrease, and in a case that when the quantity of returning light decreased, the flying height of SIL head was led to increase. The gain of the circuit for determining a voltage applied from the differential circuit to the piezoelectric elements was so adjusted as to minimize a change in terms of time of the amplitude value of track error signals which are common in optical recording disks.

In the same manner as in Example 1, the prepared magneto-optical recording medium was rotated at 2400 rpm, and the tracking was fixed to a land portion at a position of 40 mm in radius, and domains of 1.6 µm mark size were recorded with an external DC magnetic field of 300 Oe, a frequency of optical pulses of 3.14 MHz and a duty of 30%. Then, the envelope of MO signals was measured by reproducing the recorded portion. Table 1 shows a value (%) obtained by regularizing a fluctuation quantity of the obtained envelope of MO signals by a mean value of the amplitude values of MO signals for one cycle.

Example 3

Figure 7:
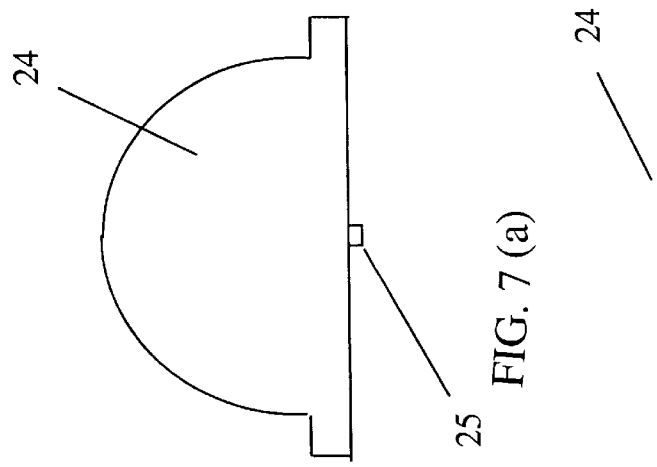
FIGS. 7(a) and 7(b) are diagrams showing SIL having a cylindrical projection in a bottom plane used in Example 3 wherein (a): a cross-sectional view, and (b): an enlarged cross-sectional view showing the cylindrical projection and surrounding thereof.
Figure 7B:
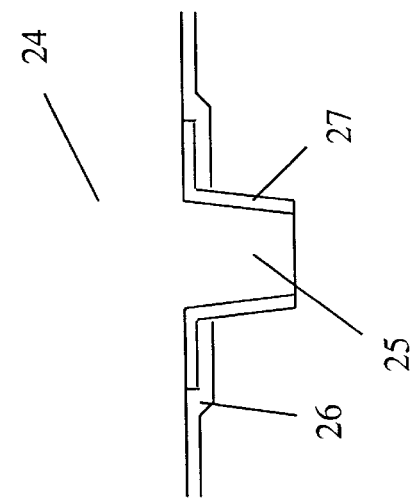

SIL having a cylindrical projection 25 at its bottom plane was prepared as shown in FIG. 7. A flying optical recording/ playback head was prepared in the same manner as in Example 1 except that the structure of the bottom plane of SIL was different, and the flying slider and SIL were simply bonded by an adhesive. As shown in an enlarge view (b), of the cylindrical projection 25 and the surrounding thereof, a cylindrical projection is formed at the lowermost plane of SIL, and a thin nichrome layer 27 is formed on the side surface of the cylindrical projection and the lowermost plane of SIL in the vicinity of the side plane. Further, a Cu wiring 26 for power supply was formed by the same technique, and patterning was conducted to an end of the slider. A Cu wire was connected by soldering to the Cu wiring 26 at the end of the slider so that power supply to the thin nichrome layer 27 formed on the side surface of the cylindrical projection became possible.

Figure 11:
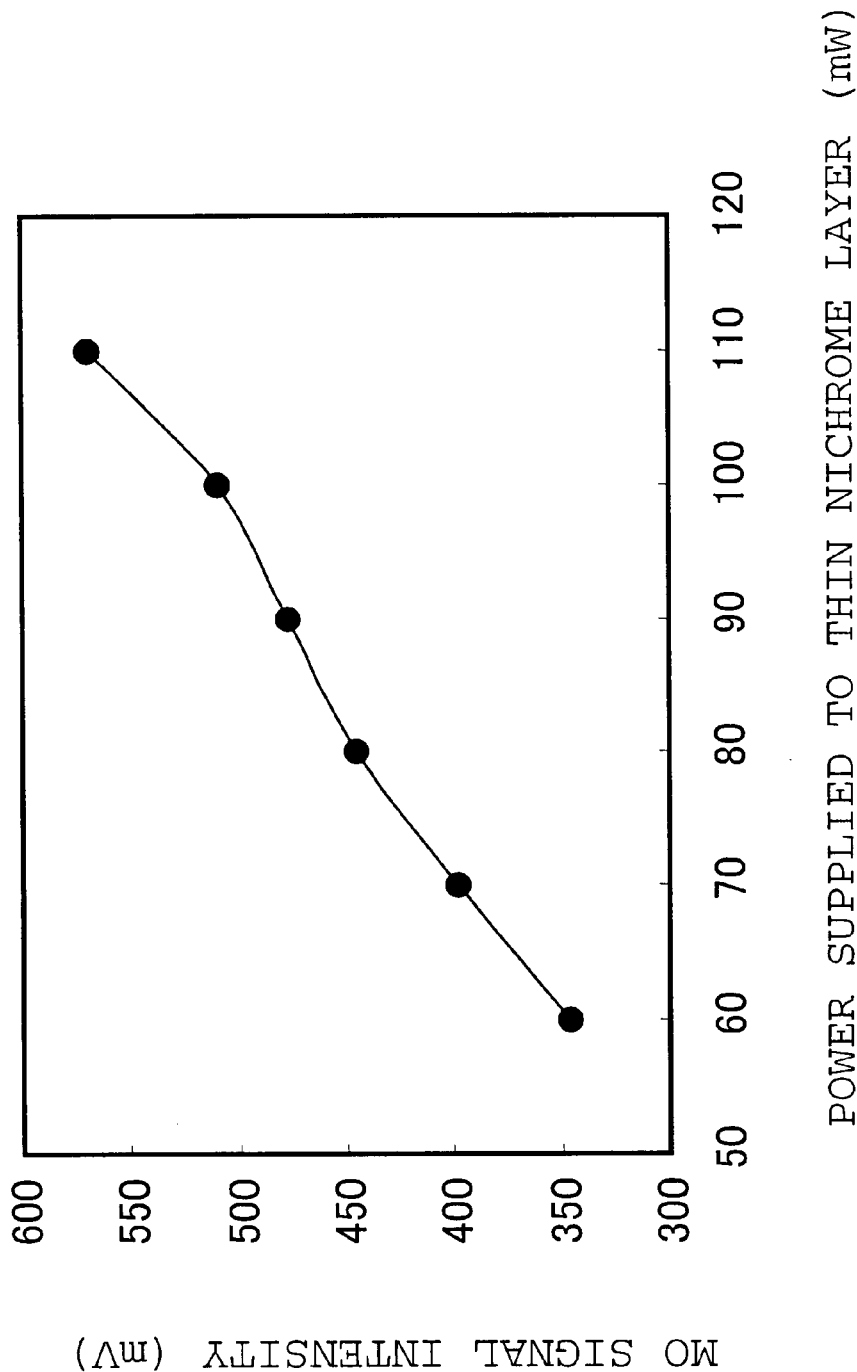
FIG. 11 is a diagram showing the relation of power supplied to a thin nichrome layer of the flying optical recording/playback head used in Example 3 to an intensity of MO signal.

FIG. 11 shows a fluctuation of the intensity of magneto-optical recording signals (MO signal intensity) vs power supplied to the thin nichrome layer of the thus obtained slider head.

In order to keep the quantity of returning light as playback light constant to thereby control the flying height of SIL of the optical recording/playback head shown in FIG. 11, the central value of fluctuation values of playback light is taken as the reference voltage, and the fluctuation values are produced by a differential circuit. A servo circuit was prepared so that when the quantity of returning light increased, power to be supplied to the thin nichrome layer was decreased to reduce the flying height of SIL head, and when the quantity of returning light decreased, power to be supplied to the thin nichrome layer was increased to increase the flying height of SIL head, based on signals obtained by passing the signals of the thus obtained fluctuation values through a low pass filter of 30 kHz.

The gain of the circuit for determining an electric current supplied from the differential circuit to the resistance wire was determined by adjusting a fluctuation of the intensity of returning light at the time of the tracking to be minimized.

In the same manner as in Example 1, the prepared magneto-optical recording medium was rotated at 2400 rpm, and the tracking was fixed to a land portion at a position of 40 mm in radius, and magnetic domains of 1.6 µm mark size were recorded with an external DC magnetic field of 300 Oe, a frequency of optical pulses of 3.14 MHz and a duty of 30%. Then, the envelope of MO signals was measured by reproducing the recorded portion. Table 1 shows a value (%) obtained by regularizing a fluctuation quantity of the envelope of the obtained MO signals by a mean value of the amplitude values of MO signals for one cycle.

Comparative Example 1

A flying optical recording/playback head was prepared in the same manner as in Example 1 except that the flying slider and SIL were simply bonded by an adhesive, and measurement was conducted in the same manner as Example 1.

Namely, the prepared magneto-optical recording medium was rotated at 2400 rpm, and the tracking was fixed to a land portion at a position of 40 mm in radius, and magnetic domains of 1.6 µm mark size were recorded with an external DC magnetic field of 300 Oe, a frequency of optical pulses of 3.14 MHz and a duty of 30%. Then, the envelope of MO signals was measured by reproducing the recorded portion. Table 1 shows a value (%) obtained by regularizing a fluctuation quantity of the envelope of the obtained MO signals by a mean value of the amplitude values of MO signals for one cycle.

As shown in Table 1, the fluctuation of MO signals was 40% in comparative Example 1. On the other hand, it could be improved to 10% in Example 1, 2% in Example 2 and 5% in Example 3 of the present invention. The fact shows that the flying height of SIL head can be controlled to be substantially constant by the present invention, and the flying height of SIL head can be substantially constant and a playback output can be kept constant by the present invention.

In the flying optical recording/playback head having an optical element such as an optical lens or the like, a device for changing the relative position between the slider and the optical element is provided so as to be capable of conducting a fine adjustment of the flying height of the optical element, whereby a fluctuation of the flying height of the optical element can be controlled and a playback output can be kept constant. Accordingly, the flying optical recording/playback head of the present invention can be used suitably as an optical recording/playback head for near-field optical recording/playback.

What is claimed is:

1. A near-field optical recording/playback system having a flying optical recording/playback head, said flying optical recording/playback head comprising:

a slider for producing buoyancy by a movement of an optical recording medium, an optical element for irradiating light for information-recording and/or playback to the optical recording medium, and a controlling device for controlling the relative position between the slider and a nearest surface of the optical element, which is nearest to the optical recording medium, wherein the relative position is controlled by said controlling device so that the returning light intensity as the sum total of a returning light quantity from the lowest portion of the optical element and a reflection light quantity from the optical recording medium is constant, so that the flying height of the flying optical recording/play back head is controlled to be constant.

2. The near-field optical recording/playback system according to claim 1, wherein control for the relative position between the slider and the nearest surface of the optical element is carried out based on a thermal expansion of an optical element supporting member for holding the optical element on the slider.

3. The near-field optical recording/playback system according to claim 1, wherein control for the relative position between the slider and the nearest surface of the optical element is carried out based on a piezoelectric effect of an optical element supporting member for holding the optical element on the slider.

4. The near-field optical recording/playback system according to claim 1, wherein control for the relative position between the slider and the nearest surface of the optical element is carried out based on a thermal expansion of at least a portion of the optical element.

5. The near-field optical recording/playback system according to claim 1, wherein the optical element is an optical lens.

6. The near-field optical recording/playback system according to claim 1, wherein the optical element is a hemi-spherical solid immersion lens (SIL).

7. The near-field optical recording/playback system according to claim 1, wherein the optical element is an optical fiber having a tapered portion thinned toward its an end thereof.

8. A near-field optical recording/playback system having a flying optical recording/playback head, said flying optical recording/playback head comprising: a slider for producing buoyancy by a movement of an optical recording medium, an optical element for irradiating light for information-recording and/or playback to the optical recording medium, said optical element having a photo-coupling portion having a flat plane substantially parallel to the surface of the optical recording medium at a side opposing to the optical recording medium, and a controlling device for controlling the relative position between the slider and the photo-coupling portion, wherein the relative position is controlled by said controlling device so that the returning light intensity as the sum total of a returning light quantity from the photo-coupling portion and a reflection light quantity from the optical recording medium is constant, so that the flying height of the flying optical recording/play back head is controlled to be constant.

9. The near-field optical recording/playback system according to claim 8, wherein the optical element is provided with a cylindrical projection projecting toward the optical recording medium in its surface opposing to the optical recording medium, and the photo-coupling portion is formed of a flat plane substantially parallel to the surface of the optical recording medium, the flat plane being at the end of the cylindrical projection, whereby the relative position between the slider and the photo-coupling portion is controlled based on a thermal expansion of the cylindrical projection.

10. The near-field optical recording/playback system according to claim 9, wherein a thin layer having an electric resistance is formed on the side surface of the cylindrical projection, whereby the relative position between the slider and the photo-coupling portion is controlled by controlling power supplied to the thin layer having an electric resistance.

11. A near-field optical recording/playback system having a flying optical recording/playback head, said flying optical recording/playback head comprising:

a slider for producing buoyancy by a movement of an optical recording medium, an optical element attached to the slider to irradiate light for information-recording and/or playback to the optical recording medium, said optical element attached to the slider having a flat plane at a light emitting side, a cylindrical projection projecting in a cylindrical form formed in a portion of the flat plane, and a thin layer having an electric resistance formed on the side surface of the cylindrical projection, and a controlling device for controlling the distance between the photo-coupling portion comprising the end plane of the cylindrical projection and the optical recording medium by utilizing a change of the shape of the cylindrical projection due to a thermal expansion, which is caused by supplying power to the thin layer having an electric resistance, wherein the relative position is controlled by said controlling device so that the returning light intensity as the sum total of a returning light quantity from the photo-coupling portion and a reflection light quantity from the optical recording medium is constant, so that the flying height of the flying optical recording/playback head is controlled to be constant.

12. A method for controlling the flying height of a flying optical recording/playback head used in a near-field optical recording/playback system, characterized by using:

a flying optical recording/playback head comprising a slider for producing buoyancy by a movement of an optical recording medium, an optical element for irradiating light for information-recording and/or playback to the optical recording medium, and a controlling device for controlling the relative position between the slider and a nearest surface of the optical element, which is nearest to the optical recording medium, wherein the relative position is controlled by said controlling device so that the returning light intensity as the sum total of a returning light quantity from the lowest portion of the optical element and a reflection light quantity from the optical recording medium is constant.

13. The method for controlling the flying height of the flying optical recording/playback head according to claim 12, wherein control for the relative position between the slider and the nearest surface of the optical element is carried out based on a thermal expansion of an optical element supporting member for holding the optical element on the slider.

14. The method for controlling the flying height of the flying optical recording/playback head according to claim 12, wherein control for the relative position between the slider and the nearest surface of the optical element is carried out based on a piezoelectric effect of an optical element supporting member for holding the optical element on the slider.

15. The method for controlling the flying height of the flying optical recording/playback head according to claim 12, wherein control for the relative position between the slider and the nearest surface of the optical element is carried out based on a thermal expansion of at least a portion of the optical element.

16. The method for controlling the flying height of the flying optical recording/playback head according to claim 12, wherein the optical element is an optical lens.

17. The method for controlling the flying height of the flying optical recording/playback head according to claim 12, wherein the optical element is a hemi-spherical solid immersion lens (SIL).

18. The method for controlling the flying height of the flying optical recording/playback head according to claim 12, wherein the optical element is an optical fiber having a tapered portion thinned toward its an end thereof.

19. A method for controlling the flying height of a flying optical recording/playback head used in a near-field optical recording/playback system, characterized by using:

a flying optical recording/playback head comprising a slider for producing buoyancy by a movement of an optical recording medium, an optical element for irradiating light for information-recording and/or playback to the optical recording medium, said optical element having a photo-coupling portion having a flat plane substantially parallel to the surface of the optical recording medium at a side opposing to the optical recording medium, and a controlling device for controlling the relative position between the slider and the photo-coupling portion, wherein the relative position is controlled by said controlling device so that the returning light intensity as the sum total of a returning light quantity from the photo-coupling portion and a reflection light quantity from the optical recording medium is constant.

20. The method for the flying height of the flying optical recording/playback head according to claim 19, wherein the optical element is provided with a cylindrical projection projecting toward the optical recording medium in its surface opposing to the optical recording medium, and wherein the photo-coupling portion is formed of a flat plane substantially parallel to the surface of the optical recording medium, the flat plane being at the end of the cylindrical projection, and the relative position between the slider and the photo-coupling portion being controlled based on a thermal expansion of the cylindrical projection.

21. The method for controlling the flying height of the flying optical recording/playback head according to claim 20, wherein a thin layer having an electric resistance is formed on the side surface of the cylindrical projection, the relative position between the slider and the photo-coupling portion being controlled by controlling power supplied to the thin layer having an electric resistance.

22. A method for controlling the flying height of a flying optical recording/playback head used in a near-field optical recording/playback system, characterized by using:

a flying optical recording/playback head comprising a slider for producing buoyancy by a movement of an optical recording medium;

an optical element attached to the slider to irradiate light for information-recording and/or playback to the optical recording medium, said optical element attached to the slider having a flat plane at a light emitting side, a cylindrical projection projecting in a cylindrical form formed in a portion of the flat plane, and a thin layer having an electric resistance formed on the side surface of the cylindrical projection; and a controlling device for controlling the distance between the photo-coupling portion comprising the end plane of the cylindrical projection and the optical recording medium by utilizing a change of the shape of the cylindrical projection due to a thermal expansion, which is caused by supplying power to the thin layer having an electric resistance, wherein the relative position is controlled by said controlling device so that the returning light intensity as the sum total of a returning light quantity from the photo-coupling portion and a reflection light quantity from the optical recording medium is constant.

* * * * *